(12) United States Patent
Schoppel et al.

(10) Patent No.: US 7,566,015 B2
(45) Date of Patent: Jul. 28, 2009

(54) PROCESS AND APPARATUS FOR DEFINED COMMUNICATION OF POLYMER GELS

(75) Inventors: Gerhard Schoppel, Steinhaus b. Wels (AT); Georg Haeubl, Linz (AT); Marion Wagner, Katsdorf (AT); Helmuth Kirsch, Wels (AT); Erich Schulz, Ansfelden (AT); Gerald Summer, Linz (AT)

(73) Assignee: DSM Fine Chemicals Austria Nfg GmbH & Co KG, Linz (AT)

( * ) Notice: Subject to any disclaimer, the term of this patent is extended or adjusted under 35 U.S.C. 154(b) by 0 days.

(21) Appl. No.: 10/270,583

(22) Filed: Oct. 16, 2002

(65) Prior Publication Data

US 2003/0080226 A1    May 1, 2003

(30) Foreign Application Priority Data

Oct. 16, 2001    (AT)    ............... A 1630/2001

(51) Int. Cl.
  *B02C 17/02*    (2006.01)
(52) U.S. Cl. ............................. 241/84; 241/95
(58) Field of Classification Search ............... 241/82.7, 241/84, 89.4, 95; 425/190, 311, 382 R; 100/125; 83/857, 425.3, 425.2, 435.17
See application file for complete search history.

(56) References Cited

U.S. PATENT DOCUMENTS

| | | | | |
|---|---|---|---|---|
| 1,487,378 | A | * | 3/1924 | Gigliotti ................. 425/382 R |
| 2,037,823 | A | * | 4/1936 | Royle ....................... 241/82.7 |
| 3,106,747 | A | | 10/1963 | Kelley et al. |
| 3,187,432 | A | * | 6/1965 | Cuomo ........................ 83/407 |
| 3,562,234 | A | | 2/1971 | Resz et al. |
| 3,738,596 | A | * | 6/1973 | Miles ............................. 241/95 |
| 3,797,982 | A | | 3/1974 | Borrello |
| 3,847,360 | A | * | 11/1974 | Seydelmann ................ 241/82.5 |
| 4,023,253 | A | * | 5/1977 | Funakubo .................... 428/566 |
| 4,040,319 | A | * | 8/1977 | Taniyama ................... 83/425.3 |
| 4,062,260 | A | * | 12/1977 | Steinhogl ................... 83/404.3 |
| 4,212,430 | A | * | 7/1980 | Dale et al. ................. 241/89.4 |

(Continued)

FOREIGN PATENT DOCUMENTS

CH    507 739    5/1971

(Continued)

OTHER PUBLICATIONS

European Search Report, issued Jan. 23, 2003.

(Continued)

*Primary Examiner*—Bena Miller
(74) *Attorney, Agent, or Firm*—Wenderoth, Lind & Ponack, L.L.P.

(57) ABSTRACT

An apparatus and process for defined comminution of polymer gels, wherein the apparatus includes a static cutting element in the form of a cutting screen. The cutting element is optionally supported, and has pretensioned wires, rods, fibers, wovens, stencils or profiles. Optionally, a dynamic cutting element is provided for shortening the gel strands or particles obtained by means of the static cutting unit. Also, a feed unit is provided for feeding the polymer gel to the static cutting element in a clamped-in, shape-stable state. The feeding of the gel is effected batchwise or continuously.

7 Claims, 3 Drawing Sheets

U.S. PATENT DOCUMENTS

| | | | | |
|---|---|---|---|---|
| 4,342,242 | A | * | 8/1982 | Schaum .................... 83/435.17 |
| 4,350,768 | A | * | 9/1982 | Tihon et al. .................. 435/379 |
| 4,374,169 | A | * | 2/1983 | Gryskiewicz et al. ....... 428/221 |
| 4,483,226 | A | * | 11/1984 | Costarelli ................... 83/425.3 |
| 4,884,960 | A | | 12/1989 | Chao |
| 5,251,827 | A | * | 10/1993 | Sims et al. ................ 241/24.21 |
| 5,605,141 | A | | 2/1997 | Bilotta .................... 125/16.02 |
| 6,358,526 | B1 | * | 3/2002 | Mergens et al. ............. 424/464 |
| 6,806,230 | B1 | * | 10/2004 | Yasuda et al. ............... 504/239 |

FOREIGN PATENT DOCUMENTS

| | | |
|---|---|---|
| DE | 195 18 645 | 9/1996 |
| FR | 2 331 438 | 6/1977 |
| JP | 55-90310 | 7/1980 |
| JP | 61-69990 | 4/1986 |
| JP | 62-147493 | 9/1987 |
| JP | 6-79691 | 3/1994 |
| JP | 2000-63527 | 2/2000 |
| JP | 2000-290166 | * 10/2000 |
| JP | 2002-177807 | 6/2002 |
| WO | 96/13542 | 5/1996 |

OTHER PUBLICATIONS

Japanese Office Action (in English language) issued Aug. 21, 2008.

* cited by examiner

PROCESS AND APPARATUS FOR DEFINED COMMUNICATION OF POLYMER GELS

BACKGROUND OF THE INVENTION

1. Field of the Invention

This invention relates to apparatus for comminuting polymer gels to obtain a defined, uniform particle size using a cutting unit comprising a static cutting element with or without a dynamic cutting element and shape-stable feeding of the polymer gel to the cutting unit, and a process for performing the comminution.

2. Description of Related Art

Water-containing polymer gels are obtained from water-soluble monomers in the course of the production of water-soluble or water-swellable polymers and are used in a very wide variety of fields. They are used for example as flocculation aids, drainage and retention aids, as viscosity-increasing agents in aqueous media, for example in tertiary oil production, as grinding or dispersing assistants, adhesives, wastewater treatment agents, as superabsorbents in the hygiene and sanitary sector or as soil improvers in agriculture, as sealing agents in the building construction industry and also in the production of electricity- and light-conducting cables or in medicine, for example to lower the cholesterol level by binding bile acids or bile acid salts or in the treatment of dialysis and predialysis patients to bind phosphates.

The production of the polymers or polymer gels, for example acrylic and allylic polymers, such as acrylic acid, methacrylic acid, hydroxyethylmethacrylic acid and acrylamide homopolymers and their derivatives or copolymers composed of a major fraction of acrylic acid, methacrylic acid, hydroxyethylmethacrylic acid and acrylamide derivatives and other copolymerizable or crosslinking monomers, of polymer gels based on native or chemically modified proteins (eg gelatin and derivatives thereof) or of polymer gels based on natural or chemically modified homo- and heteropolysaccharides such as for example starch and cellulose, agarose, carageenan, chitosan, xanthan, guar gum, alginate, pectinate, sucrose gels, and also of polymer gels based on polyelectrolyte-sucrose gels, and also of polymer gels based on polyelectrolyte complexes, such as copper alginate for example, of polymer gels based on hydrolyzed crosslinked maleic anhydride copolymers (eg crosslinked hydrolyzed, partly neutralized maleic anhydride-methyl vinyl ether copolymers or maleic anhydride-styrene copolymers), of N- or amino- or ammonium-containing polymers having cationic groups and suitable counterions, which can contain hydrophobic groups, where appropriate, is generally effected by bulk polymerization, suspension polymerization, emulsion polymerization or solution polymerization, as described for example in EP-A1-068 189, EP-A1-0 415 141, EP-A-0 374 709, WO 00/38664, WO 99/33452, WO 99/22721, WO 98/43653, U.S. Pat. No. 5,496,545, EP-A1-0 366 986, etc.

The polymer gels in question can be produced in 2 different ways.

a) By polymerization and partial crosslinking in a single step.

b) By subsequent crosslinking of a synthetic or natural polymer or of derivatives thereof.

The prior art polymerization reaction is followed by appropriate crosslinking (gelling). This provides, as a function of the monomers and crosslinkers used and/or of the polymerization parameters, polymer gels which are water-containing, soft and rubbery or which are brittle and extremely shear sensitive.

The processing of these polymer gels to form powders is effected in the subsequent process or workup steps, such as for example coarse comminution, fine comminution, polymer-analogous chemical reaction, washing, separation, drying and grinding etc. and hitherto represented an appreciable cost and inconvenience if the polymer properties achieved in the gel state, such as for example swelling properties and particle structure, and associated processing properties, such as for example chemical convertibility, sedimentation capability, filtration speed, drying speed and grindability, were to be preserved. Thus, as described in WO 96/36464 for example, the requisite uniformity of the processing sequence was already impaired by the precomminution and comminution of the soft, rubbery or brittle gels, since rubbery gel blocks or gel strands are for example torn apart by kneaders into nonuniformly sized pieces, whereas the division of soft gels produces with increasing plasticity gel portions having ever larger dimensions and the kneading tools are often blocked by gel portions which have become wrapped thereon. This gives rise to an uneven flow of material, which leads to different layer thicknesses for example in foraminous belt drying and hence to an insufficient or excessive drying of the polymer with impairment of the subsequent grinding and classifying operation and which, on the other hand, for example by hornification or by the partial thermal degradation of the polymer, gives rise to a reduction in quality, for example in swellability, the generation of toxic gases etc, and hence to inferior performance on the part of the product. In lieu of kneaders it is generally also customary to use extruders, for example a meat grinder, to comminute polymer gels, by forcing the gel by means of a conically narrowing single-screw conveying system through a breaker plate. However, this system is absolutely unsuitable for pressure- and shear-sensitive polymer gels, since the gel—even in the case of built-in rotating cutting blades—is more sheared than cut apart, which gives rise to enormous problems in the washing and the subsequent separation of the gels.

The literature, for example DE 35 39 385, DE 35 06 534 or WO 96/36464, discloses further comminuting processes and apparatuses, which, however, either have a very costly and inconvenient construction and/or imply a complicated, costly or inconvenient comminuting operation or which are suitable for coarse division only and in no instance lead to a uniform particle distribution.

SUMMARY OF THE INVENTION

It is an object of the present invention to provide a novel apparatus and a process for the defined comminution of a polymer gel, especially of water-containing polymer gels, into uniform, preferably small, particles which, compared with the prior art, have improved properties, such as better controlled chemical convertibility, washability, separability, filterability, drying properties, grindability, coupled with a reduced loss of fines in the respective separating and process steps.

We have found that this object is achieved, unexpectedly, by apparatus composed of two or three main elements, namely a static cutting element, optionally a dynamic cutting element and a feeder which feeds the gel to the cutting elements in a clamped-in or shape-stable state.

The present invention accordingly provides apparatus for defined comminution of polymer gels, constructed of:

a) a static cutting element in the form of screen-shapedly disposed, optionally supported, pretensioned wires, rods, fibers, wovens, stencils or profiles;

b) optionally a dynamic cutting element for shortening the gel strands or particles obtained by means of the static cutting unit, in the form of one or more optionally supported, guided and tensioned wires or wovens; and c) a feed unit to feed the polymer gel to the static cutting element in a clamped-in, shape-stable state the feeding being effected batchwise or continuously.

The apparatus of the present invention is composed of two or three main elements.

The first main element is the static screen-shaped cutting unit which is composed of optionally supported, pretensioned wires, rods, fibers, wovens, stencils or profiles.

Suitable wires, rods, fibers, wovens, stencils or profiles can be composed not only of inorganic material, for example of optionally coated, surface-finished metal, for example of alloyed or nonalloyed steels, including stainless steels, iron, aluminum, copper, tantalum, or of glass, carbon, ceramic, boron, such as glass fiber, carbon fibers, ceramic fibers and boron fibers, etc, but also of polymeric organic material, whether of wholly synthetic, partly synthetic or natural origin, such as for example of polyethylene (eg UHMW PE), polypropylene, polyesters, polyamides, aramid, polyetheretherketones (PEEKs), polysulfones, polytetrafluoroethylene, cellulose, etc.

Preference is given to using metal wires, rods, wovens or profiles or high strength polymeric fibers. Particular preference is given to wires, rods, wovens, stencils or profiles composed of stainless steel, spring steel or fibers of polyethylene (eg: Dyneema® UHME PE) and aramid (eg: Kevlar).

The shape or cross section of the wires and rods can be rectangular, square, triangular, hexagonal or round. The wires and rods used preferably have a square, triangular or round cross section and more preferably a round cross section. A combination of the geometries is also possible (square with triangular or round with triangular). But the wires and rods can also be flattened or beveled (sharpened) on one or both sides. The diameter or thickness of the wires and rods is between 0.05 and 10 mm, preferably between 0.08 and 6 mm and more preferably between 0.1 and 2.5 mm.

In the static cutting element, the wires, rods or fibers are disposed to form a screen in which the interspaces or mesh size correlate with the desired shapes and dimensions, especially with the cross section of the comminuted gel particles. The screen's interspaces can be triangular, square, rhombohedral, trapezoidal or rectangular, but preference is given to square interspaces. According to the invention, the interspaces have a side length of 0.1 to 200 mm, preferably of 0.2 to 100 mm and more preferably of 0.4 to 10 mm, whereby gel particles having a diameter corresponding to the dimensions chosen from the screen's interspaces are obtained.

When wires or fibers are used for the screen, it is advantageous for them to be appropriately pretensioned (up to the yield point in the case of metal wires) in order to create a defined uniform cutting geometry. The wires, rods and fibers of the screen may not be joined together or may be joined together by weaving, looping, adhering, sintering, laser welding, etc.

Instead of wires, rods or fibers, the static cutting element can also be composed of a woven fabric or a stencil or profile. Suitable stencils or profiles are preferably composed of metal and can be formed by die cutting, etching, laser machining, etc.

The stencil's interspaces can be disposed not only squarely, triangularly, rhombohedrally and trapezoidally, but also roundedly and preferably hexagonally comb-shapedly, which yields advantages with regard to particle uniformity.

The dimensions of the interspaces are chosen as with the use of wires, rods or fibers.

The static cutting element is preferably formed of wires, woven mesh or rods and more preferably of wires and woven mesh.

The static cutting element can in principle be disposed both horizontally and vertically.

The static cutting element can optionally be equipped with a support. This is especially advantageous when using wires, fibers or wovens, to obtain better stability. The support can be realized in the form of a mutually stiffening grid or a coarse wire cloth or in the form of a screen which can also be configured as a screen fabric. It is preferable to use a grid to support the static cutting element.

The support is preferably rounded off on the side facing the static cutting element in order that there may be no broken wire due to notching between static cutting element and supporting grid.

The dimensions of this support are dependent on the size of the static cutting element. The thickness of this support is dependent on the cutting forces to be applied to the gel to be cut (gel hardness) and on the diameter of the screen or fabric to be supported. For example, the supporting grid can be 80 mm for a diameter of 800 mm. The supporting grid is likewise preferably of metal and more preferably of stainless steel and can where appropriate be welded into a ring for strength reasons. In a preferred embodiment, the stays are half cut and pushed into one another and are more preferably joined together by welding for stiffness reasons.

The support is directly mounted downstream of the static cutting element, so that adequate stabilization of the same is ensured during the comminution of the gels while at the same time the shape stability of the polymer gel is preserved. In the presence of a grid support, the shape-stable gel feed provides a clean cut similar in quality to that obtained in the case of direct cutting immediately below or alongside the static cutting element. This applies particularly to comparatively small cut cross sections, where no supporting grid is needed on account of the low deflection.

The supported or unsupported static cutting element is followed by a second main element, a dynamic cutting element which serves to shorten the gel strands or particles obtained by means of the static cutting element. However, if the gel strands are not cut any further, the dynamic cutting element is not needed.

According to the invention, the dynamic cutting element is composed of one or more guided and tensioned wires or fibers or of wovens which, to improve the uniformity of the particle length especially in the case of large diameters, can also be supported or guided. The support prevents any deflection on the part of the transverse cutting wires, which has a particularly advantageous effect on the uniformity of the particle length. The support in the most simple case can be composed of a relatively coarsely woven fabric, for example stainless steel or plastic, which is tensioned in a mobile frame. But the support for the transverse cutting wires can also take the form of a plurality of supporting struts which are distributed over the clamped length and which have likewise been clamped into an appropriate mobile frame. The supporting struts preferably possess drilled holes into which have been inserted drilled-through plastic bushes through which the tensioned transverse cutting wires are passed. The plastic bushes provide a somewhat broader platform for the wire or fiber support and thereby bring about a lower wire or fiber wear to distinctly improve the use life of the dynamic cutting element.

According to the invention, the dynamic cutting element can be a tensioned monowire which is disposed as a rotating, segmentally rotating or traversing wire hoop.

A further embodiment of the dynamic cutting element is composed of tensioned wires which are disposed in a rotating spoked wheel having a hub. The number of wires depends on the speed of rotation of the cutting wheel compared with the forward feed speed. In another embodiment, the tensioned wires can also be disposed in a grate frame which moves back and forth in operation. It is of advantage here for the wires to be equipped with additional stays for the purpose of guidance and support.

A fourth embodiment is a coarsely tensioned screen cloth which is moved back and forth in a grate frame. The wires, fibers and wovens used for the dynamic cutting element can be composed not only again of inorganic material, for example of optionally coated, surface-finished metal, for example of alloyed and nonalloyed steels, including stainless steels, iron, aluminum, copper, tantalum, or of glass, carbon, ceramic, boron, such as glass fiber, carbon fibers, ceramic fibers and boron fibers, etc. but also of polymeric organic material, whether of wholly synthetic, partly synthetic or natural origin, for example of polyethylene (eg UHMW PE), polypropylene, polyesters, polyamides, aramid, polyetheretherketones (PEEKs), polysulfones, polytetrafluoroethylene, cellulose, etc. Preference is given to using metal wires or wovens or high strength polymeric fibers. Particular preference is given to wires or wovens composed of stainless steel, spring steel or fibers of polyethylene (eg: Dyneema®; UHMW PE) and aramid (eg: Kevlar).

In the apparatus according to the invention, the dynamic cutting element is always disposed at right angles to the press-out direction of the static cutter, although two further points are preferably observed for optimum cutting quality.

Thus, the distance between the dynamic cutting element and the static cutting element is preferably very small. The distance in the preferred embodiments is therefore preferably not more than 10 mm and more preferably not more than 2 mm. Larger distances can likewise be chosen, but are disadvantageous if optimum cutting quality is to be obtained. An alternative, which allows larger distances between the dynamic and static cutting elements while at the same time ensuring optimum cutting quality, is that the particles cut with the static cutting element are forwarded in a shape-stable state in a clamped-in, self-stiffening grid to the dynamic cutting element, which is placed directly at the downstream end of the grid.

A second important point concerns the cutting speed of the dynamic cutting element. The faster the cutting speed of the dynamic cutting element, the less the soft and flexible particles are able to bend away from or evade the cut. The higher consequently the cutting speed of the dynamic cutting element compared with the forward feed speed of the polymer gel, the better the quality of cut.

The ratio of the cutting speed of the dynamic cutting element to the forward feed speed of the gel strands has an influence on the shape and uniformity of the cut particles. This is especially the case in the grate embodiment (traversing movement) of the dynamic cutting unit.

The cutting speed of the dynamic cutting unit in the apparatus according to the invention is preferably not less than the forward feed speed of the polymer gel or gel strands. It is preferable to have a ratio of at least 2:1 and particularly of at least 10:1 for cutting speed to forward feed speed. Slower cutting speeds can also be chosen, but they do not have an advantageous effect on cutting quality.

The third main element is the feed unit to feed the polymer gel to be cut to the static cutting element in a shape-stable, clamped-in state. This shape-stable feed can be effected batchwise or continuously.

In the batchwise version, the polymer gel is fed to the cutting elements via a closeable chest by means of a horizontal plunger press-out device. For this, the gel is first coarsely precut into blocks which are then charged into the chest. A lever is used to shift, i.e. enlarge, the front part of the chest in the course of filling, to facilitate the chest-filling operation. The chest is sealed at the top by a bladelike slider and the front part of the chest is pushed forward to such an extent that there is a slight sideways press which does not impair the forward movement of the rectangular press plunger (1), yet a sealed-off space is formed nonetheless, whereby the gel polymer blocks are fed in a clamped-in, shape-stable state to the cutting elements.

In a further preferred batchwise version, the polymer gel is pressed out of a tubular container in which the production of the polymer gel or crosslinking of the polymers is effected.

The container has a removable lid and a removable base with appropriate seals. As the container is fed to the cutting unit, the lid is removed first. The base is preferably removed by passing the container over a centering flange. In the process, the base of the container is preferably forced over a shear-off edge, for example of plastic, preferably of Teflon, or over a plastic-coated or -clad, preferably Teflon-coated or -clad, shear-off edge, whereby the container base is left lying upstream of the shear-off edge and the container is at the same time pushed onto the centering flange, so that the polymer structure of the gel is not destroyed. In order that the lower container seal, preferably a dovetailed seal, may not be damaged, the container is slightly raised during the shearing off of the container base, preferably by means of lateral rollers attached to the container and appropriate guide rails, and lowered back onto the centering flange when arriving at the latter. The pressing-out of the polymer gel can be started when the container is situated on the centering flange, which is disposed centrically above the static cutting element, and a fixation of the container has taken place, for example by means of clamping tongs, which are operated electromagnetically, hydraulically or pneumatically for example.

In this embodiment of the invention, the pressing-out is effected by means of a press plunger which is centeredly introduced into the container at the desired forward feed speed. To ensure centered introduction into the container, the press plunger is preferably mounted in a ball socket, so that it is moveable in all directions and the plunger's own weight causes it to fall into the perpendicular position. The container further preferably has a centrical bevel which likewise facilitates the centrical introduction of the press plunger.

However, the polymer gel can also be fed continuously. This is particularly the case when the production of the polymer gel is effected in a continuous manner in a tubular reactor, for example similarly to EP-0 374 709. The contained process in the case of the continuous feed offers an immense advantage with regard to product and occupational hygiene.

Preferred combinations of the apparatus according to the invention are composed of:

a) a horizontally disposed press plunger (pressing means), a chest, a static cutting screen and a cutting wheel; or of b) a standing or hanging press plunger, a container in which the production of the polymer gel is effected, a static cutting screen and the grate embodiment of the dynamic cutting element; or c) for the continuous embodiment, of a continuous tubular reactor with static cutting screen, optionally with supporting grid and a cutting wheel; or
d) for the continuous embodiment, of a continuous tubular reactor with a static cutting screen, optionally with supporting grid and the grate embodiment of the dynamic cutting element.

The abovementioned object is further achieved according to the invention by a process for defined comminution of polymer gels, preferably of water-containing polymer gels, which comprises using the apparatus according to the invention to cut the polymer gel directly after polymerization or crosslinking of the polymer into polymer gel particles of uniform size. To this end, the gel is fed by the feeding unit in a shape-stable, clamped-in state to the static cutting element and is pressed therethrough at a certain forward feed speed, whereupon the resulting gel strands are, where appropriate, cut by the dynamic cutting element, as a function of the chosen cutting speed, into uniform particles having the desired dimensions (lengths).

The apparatus and process according to the invention provide defined comminution of the polymer gels into uniform particles which, compared to the prior art, have improved properties, such as better washability, controlled chemical convertibility, separability, filterability, drying properties, grindability, coupled with a reduced loss of fines in the respective separating and processing steps.

The particles obtained according to the invention are prismatic particles of preferably square geometry or are cylindrical particles. The length of the prisms or cylinders can vary from 0.1 mm up to the natural breaking length. Preferably, however, the cut length is between 0.2 and 100 mm and more preferably between 0.4 and 10 mm. The diameter of the particles is dictated as described above by the dimensions of the screen or screen interspaces of the static cutting element and is 0.1 to 200 mm, preferably 0.2 to 100 mm and more preferably 0.4 to 10 mm. More preferably, the cut particles have a cubic shape or a ratio of 1:1 for prism or cylinder height to prism or cylinder diameter.

The apparatus and process according to the invention are useful for polymer gels, preferably for water-containing polymer gels, for example for acrylic and allylic polymers, such as acrylic acid, methacrylic acid, hydroxyethylmethacrylic acid and acrylamide homopolymers and their derivatives or copolymers composed of a major fraction of acrylic acid, methacrylic acid, hydroxyethylmethacrylic acid and acrylamide derivatives and other copolymerizable or crosslinking monomers, for polymer gels based on native or chemically modified proteins (eg gelatin and derivatives thereof) or for polymer gels based on natural or chemically modified homo- and heteropolysaccharides such as for example starch and cellulose, agarose, carageenan, chitosan, xanthan, guar gum, alginate, pectinate, sucrose gels, and also for polymer gels based on polyelectrolyte complexes, such as copper alginate for example, for polymer gels based on hydrolyzed crosslinked maleic anhydride copolymers (eg crosslinked hydrolyzed, partly neutralized maleic anhydride-methyl vinyl ether copolymers or maleic anhydride-styrene copolymers), and for N- or amino- or ammonium-containing polymers having cationic groups and suitable counterions, which can contain hydrophobic groups.

Suitable polymers and polymer gels are known for example from EP-A1-068 189, EP-A1-0 415 141, EP-A-0 374 709, WO 00/38664, WO 99/33452, WO 99/22721, WO 98/43653, U.S. Pat. No. 5,496,545, EP-A1-0 366 986, etc.

The apparatus and process according to the invention are each preferably used for cutting crosslinked, aqueous polymer gels, more preferably N- or amino- or ammonium-containing polymers with cationic groups and suitable counterions, which may optionally contain hydrophobic groups.

Embodiments of the apparatus according to the invention are depicted in FIGS. 1 to 3 and will now be more particularly described.

DETAILED DESCRIPTION OF THE INVENTION

Figure 1:
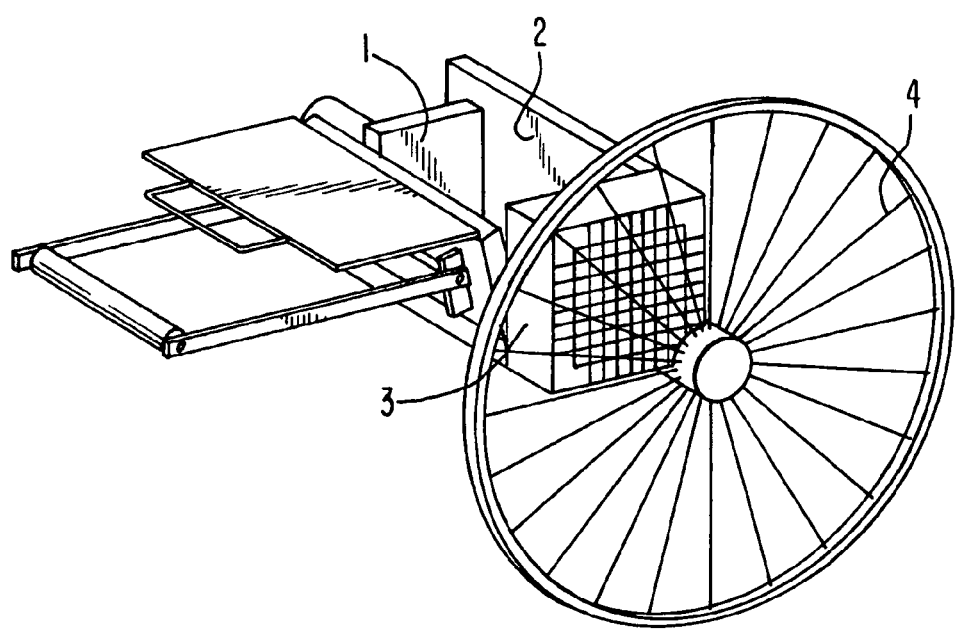
FIG. 1 is a perspective view of a first embodiment according to the invention.

FIG. 1 shows an apparatus composed of a horizontally disposed press plunger (pressing means) (1), a chest with sideways prepress and lid (2), a static cutting element with cutting screen (3) and a cutting wheel with cutting wires (4) as a dynamic cutting element.

Figure 2:
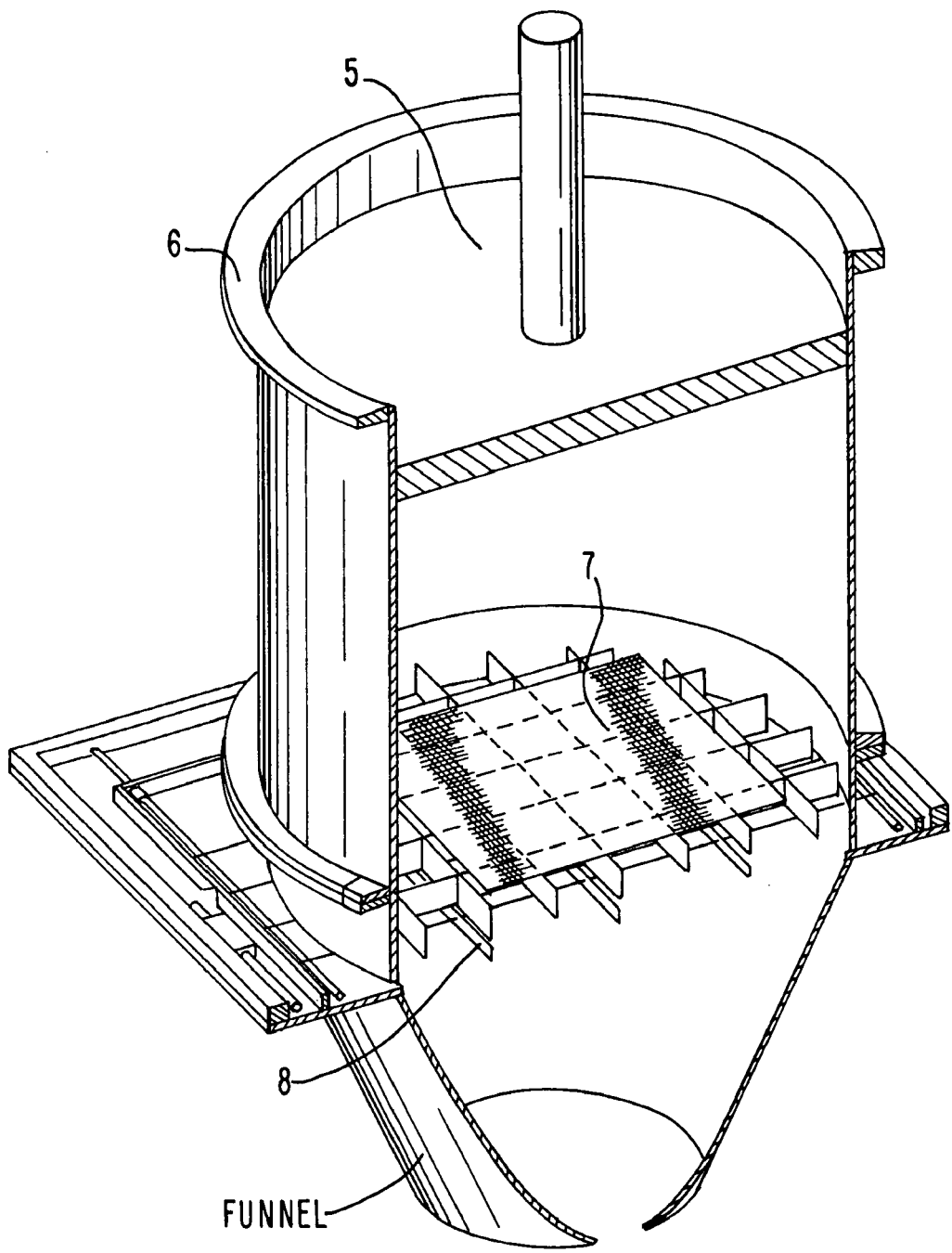
FIG. 2 is a perspective view of a further embodiment according to the invention.

FIG. 2 shows an apparatus composed of a hanging press plunger (5), a container in which the production of the polymer gel is effected (gelling drum) (6), a static cutting element with cutting screen and supporting grid (7) and the dynamic cutting element with cutting grate with cutting wire guidance (8).

Figure 3:
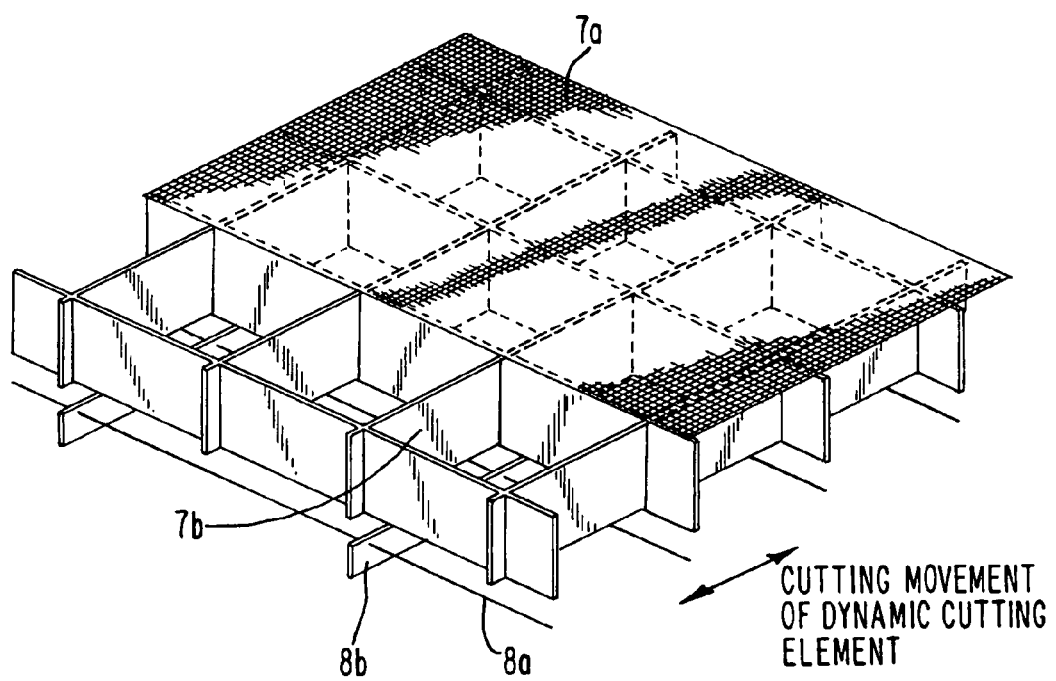
FIG. 3 is a perspective view of a detail of the cutting elements of FIG. 2.

FIG. 3 shows the cutting elements of FIG. 2, showing the cutting screen (7a) and the supporting grid (7b) of the static cutting element and also the cutting wires (8a) with the cutting wire guidance (8b) of the dynamic cutting element.

EXAMPLE 1 a) Description of Polymer Gel

This patent example utilized a crosslinked, aqueous polyallylamine. To this end, 277 kg of a 19% aqueous polyallylamine solution (molecular weight: 20 000) were thoroughly homogenized with 3.17 kg of epichlorohydrin at a pH of 10 and at a reaction temperature of 20° C. over a period of 30 minutes. This mixture was then allowed to cure in a gelling vessel at room temperature for at least 30 hours. The result was an extremely shear-sensitive polymer which could not be comminuted with knives without a significant production of fines.

b) Cutting Operation Using a Cutting Apparatus as Per FIG. 1

To this end, a Mustang 100-CE machine from TREIF was adapted with an inventive static cutting element suitable for these purposes and with a dynamic cutting element. A closeable cutting chamber was filled with the above-described crosslinked polyallylamine (polymer gel). It was necessary for this that the polymer gel had already been prepared in this shape or had been appropriately precomminuted into suitable blocks. The chest was filled by hand. The polymer gel-filled chest was subsequently sealed by means of a lever mechanism and a moveable block of plastic which has the function of a lateral seal. A moveable metal slide formed into a blade closed the fill inlet off from above. The closing pressure of the chest was adjustable and could be adapted to the pressure sensitivity of the polymer gel. One side of the chest was closed off by the withdrawn press plunger, which was in the starting position. The static cutting element was on the side opposite the press plunger. The press plunger forced the polymer gel contained in the chest through the static cutting element (cutting screen), cutting the polymer particles into endless strands. However, the dynamic cutting element immediately adjoining the static cutting element did not cut any endless strands, but cut very uniform polymer particles. The static cutting element was composed of tensioned monowires which were disposed in a crossed arrangement. The monowires were tensioned using a suitable guidance and by means of a suitable tensioning apparatus. The dynamic cutting element used was a spoked wheel having 24 tensioned wires. The speed of rotation of the spoked wheel was adjustable, making it possible to adjust the particle length as a function of the forward feed speed.

c) Materials and Cutting Parameters

Piston composed of Teflon; other product-contacted parts composed of stainless steel
Piston dimensions: 96×96 mm
Chest dimensions: 96×96×550 mm
Length of lateral plastic block: 590 mm
Forward feed speed: 30 mm/s Static cutting element:
Number of tensioned longitudinal wires: 48 off
Number of tensioned transverse wires: 48 off
Wire thickness: 0.5 mm
Wire spacing: 1.5 mm (mesh size)
Arrangement of wires: square
Dimensions of clear area of cutting screen: 96×96 mm
Wire material: 1.4571 (V-4A)

Dynamic cutting element: spoked wheel
Spoked wheel outside diameter: 465 mm
Stay width of outer wheel: 11.5 mm
Clear cutting wire length: 183 mm
Hub outside diameter: 77 mm
Wire thickness: 0.5 mm (1.4571)

The distance between the static and dynamic cutting elements was 1 mm.

Evaluation of cut outcome: cubic particle size

Size: about 1.5 mm; virtually no fines

The comminuted polymer gel thus produced was admixed with 2 times the weight of methanol and subsequently stirred for 15 minutes and rated for sedimentation capability and filterability. The results are summarized in table 1.

EXAMPLE 2

The crosslinked polyallylamine described in example 1 was used. After stirring at room temperature for about 30 minutes, it was filled while still liquid into a tubular container with detachable base and lid. Following a curing time of 30 hours, the gel was comminuted in the hereinbelow indicated apparatus as per FIG. 2.

Material of cylindrical container, of base and of lid: (1.4571) stainless steel. The inner surface of the container had been electropolished and had an average roughness depth of Ra<0.5 μm.

Immediately before the partly crosslinked aqueous polymer gel was pressed out, the cylindrical vessel, with base and lid removed, was placed via a centering flange above the cutting tool.

The press plunger was composed of a 1.4571 stainless steel plate coated with Teflon.

Container dimension:

Internal diameter: 800 mm

Container length: 700 mm

Amount of polymer gel: 280 kg

Dimensions of static cutting element:

Diameter: 800 mm

Mesh size: 1.4×1.4 mm; wire thickness 0.45 mm (from Haver & Boecker).

Fabric material: 1.4571 stainless steel

This woven mesh was pulled over a tensioning ring and adhered thereto using a 2-component adhesive. The woven mesh was further supported with a supporting grid.

Dimensions of supporting grid:

100×100 mm in square: grid height: 80 mm

Dynamic cutting element: grate with 9 tensioned longitudinal wires supported 3 times in the center.

Grate traverse length: 100 mm

Wire thickness: 0.5 mm

Material: 1.4401 spring steel wire

Cutting parameters:

Forward feed speed of press plunger: 30 mm/min

Distance between supporting grid and cutting grate: 1 mm

Cutting speed: 100 mm/s

Evaluation of cut outcome: cubic particle size Particle size 1.4 mm; virtually no fines The comminuted polymer gel thus produced was admixed with 2 times the weight of methanol and subsequently stirred for 15 minutes and rated for sedimentation capability and filterability. The results are summarized in table 1.

EXAMPLE 3

The material used was a polyallylamine crosslinked similarly to example 1, except that 1.57 times the crosslinker fraction was used. This crosslinked polymer gel was comminuted similarly to example 1.

The comminuted polymer gel thus produced was admixed with 2 times the weight of methanol and subsequently stirred for 15 minutes and rated for sedimentation speed and filtration speed. The results are summarized in table 1.

EXAMPLE 4

The same polymer as in example 1 was used and the cutting apparatus as per FIG. 2 was used.

Tubular container with detachable base and lid.

Press plunger: 1.4571 material provided with a 20 mm thick nylon-6,6 plate.

Container dimensions:

Internal diameter: 800 mm

Surface finish: electropolished, roughness depth<0.5 μm

Container length: 700 mm

Amount of polymer gel: 340 kg

Dimensions of static cutting screen: diameter: 800 mm

Mesh size: 1.4×1.4 mm; wire thickness 0.28 mm (from Haver & Boecker).

Fabric material: 1.4401

Supporting grid: grid 100×100 mm; grid height: 80 mm

Dynamic cutting element: cutting grate in moveable frame having 9 tensioned longitudinal wires supported 3 times in the middle.

Grate traverse length: 100 mm

Wire thickness: 0.28 mm

Material of wires: 1.4401

Cutting parameters:

Forward feed speed of press plunger: 60 mm/min

Particle length: cubic 1.4 mm

Cutting speed of dynamic cutting grate: =100 mm/s

The comminuted polymer gel thus produced was admixed with 2 times the weight of methanol and subsequently stirred for 15 minutes and rated for sedimentation capability and filterability. The results are summarized in table 1.

EXAMPLE 5

Same as example 2, except cutting length 0.5 mm length.

EXAMPLE 6

Same execution as example 2, except cutting length 5 mm.

EXAMPLE 7

Same execution as example 2, except a tensioned polymeric fabric was used as static cutting element.

Material: polypropylene (manufacturer: SEFAR/CH).

Style: Sefar Propyltex 05-3360/60; woven fabric with square meshes

Dimensions: w=30 mm; d=1.0 mm, (w=mesh size; d=fiber thickness)

Cut outcome: cubic, 3 mm; virtually no fines.

EXAMPLE 8

Same execution as example 2, but a UHMW PE fiber (Dyneema, from DSM/NL) was used for the cutting grate.

Cut outcome: cubic, 1.4 mm; virtually no fines.

EXAMPLE 9

Same as example 1, except that the polymer gel used was a 5% by weight carrageenan solution which was boiled up for 1 minute and subsequently cooled down to room temperature.

Cut outcome: cubic, 1.5 mm; virtually no fines.

EXAMPLE 10

Same as example 1, except that the polymer gel used was an acrylamide copolymer. This polymer gel was produced similarly to EP 415 141 B1.

A 50 liter reactor was charged at 20° C. with 15 kg of deionized water followed by 12 kg of 50% (w/w) of aqueous acrylamide solution and 4.3 kg of 50% (w/w) of aqueous sodium acrylamidomethylpropanesulfonate solution and then by 0.002 kg of methylenebis-acrylamide. After intimate mixing, hydrochloric acid was used to set a pH of 5. After purging with nitrogen for 30 minutes, the polymerization was initiated. The initiator used was 0.5 g of $Na_2S_2O_5$ and 1 g of $(NH_4)_2S_2O_8$, which were added in 1 kg of water. The polymerization was carried out adiabatically and ended in the course of 2 hours.

This gel was comminuted with the apparatus as described in example 1.

Evaluation of cut outcome:

Particle length: 1.5×1.5×2 mm; virtually no fines.

EXAMPLE 11

Continuous Polymerization

The polymerization was carried out similarly to patent example 1 described in EP 0 374 709 A2. The monomer mixture, initiator combination and release liquid described in example 1 of EP 0 374 709 A2 was used.

A vertical Teflon-coated metal tube 200 mm in diameter and 4 m in length was used. At the beginning, the tubular reactor sealed with a Teflon plate was half filled with polymer solution and this polymer solution was polymerized under adiabatic conditions for 2 hours. The metal plate was then removed and the cutting tool attached. The monomer solution and initiator solution were separately and continuously homogenized by means of metering pumps tangentially in a dynamic mixing chamber having a high-speed stirrer and then this homogeneous polymerization solution was continuously fed by a high-pressure piston pump to the tubular reactor. The adiabatic regime caused the temperature to rise to about 80° C. The feed was 62 kg/hour.

The static cutting tool was a woven square mesh having a mesh size of 1.4 mm and a wire thickness of 0.45 mm which was pretensioned between two flanges and adhered with a 2-component system. A cross (as the simplest form of a grid) was welded into the tube underneath the static cutting fabric to support the static cutting fabric. The dimension of the supporting cross: sheet metal thickness 1.5 mm, round at the top, inserted into each other and welded together; height: 50 mm; similarly welded to the outer wall of the stainless steel tube.

Distance between static and dynamic cutting elements was 1 mm.

The dynamic cutter was embodied as a rotating cutting hoop which was operated at a speed of rotation of 16 rpm.

The cut polymer gel obtained was virtually free of fines and the dimensions of the prismatic particles were 1.4×1.4×2 mm.

EXAMPLE 12

Comparative Example

The polymer gel produced under example 1 was comminuted in a LASKA W-130 meat grinder. The diameter of breaker plate was 130 mm.

The polymer gel was forced by the meat grinder through a breaker plate having holes 3.5 mm in size.

Number of blades: 4 off.

EXAMPLE 13

Determination of Sedimentation Capability and Filterability

The comminuted polymer gels thus produced were admixed with 2 times the weight of methanol and subsequently stirred for 15 minutes and rated for sedimentation capability and filterability. The results are summarized in Tab. 1 as well as the particle morphology and particle dimensions.

Comparison of Comminuted Gel Polymers:

| Ex. # | Fines | Particle dimensions | Sedimentation capability in MeOH | Wash-and filterability in MeOH |
|---|---|---|---|---|
| 1 | virtually no fines | cubic, 1.5 × 1.5 × 1.5 mm | good | good |
| 2 | virtually no fines | cubic, 1.4 × 1.4 × 1.4 mm | very good | very good |
| 3 | virtually no fines | cubic, 1.5 × 1.5 × 1.5 mm | good | very good |
| 4 | virtually no fines | cubic, 1.4 × 1.4 × 1.4 mm | very good | very good |
| 5 | virtually no fines | Prismatic, 1.4 × 1.4 × 0.5 mm | very good | good |
| 6 | virtually no fines | prismatic, 1.4 × 1.4 × 5 mm | very good | very good |
| 7 | virtually no fines | cubic, 3 × 3 × 3 mm | very good | very good |
| 8 | virtually no fines | cubic, 1.4 × 1.4 × 1.4 mm | very good | very good |
| 9 | virtually no fines | cubic, 1.5 × 1.5 × 1.5 mm | good | good |
| 10 | virtually no fines | prismatic, 1.5 × 1.5 × 2 | good | good |
| 11 | virtually no fines | prismatic, 1.4 × 1.4 × 2 | good | good |
| Comparative example 12 | undefined particle size, sheared product | very broad particle distribution from 20 μm to 500 μm | very slow | virtually unfilterable. |

We claim:

1. An apparatus for comminution of polymer gel, said apparatus comprising:
   a static cutting unit including a cutting screen for obtaining gel strands, wherein the cutting screen is formed of pretensioned members, and the static cutting unit includes a stiffening grid for supporting the cutting screen;
   a dynamic cutting element, positioned downstream of the static cutting unit, for cutting the gel strands formed by the static cutting unit into particles of uniform size and shape; and
   a feed unit for feeding the polymer gel to the static cutting unit in a shape-stable state, wherein the feed unit is operable to feed the polymer gel batchwise or continuously, and the dynamic cutting element comprises at least one tensioned wire supported in a movable support frame such that movement of the support frame effects back and forth movement of the tensioned wire.

2. The apparatus as claimed in claim 1, wherein the static cutting unit and the dynamic cutting unit are spaced from each other so that the static and the dynamic cutting units are not in contact with each other, and wherein the spacing between the static cutting unit and the dynamic cutting unit is not greater than 10 mm.

3. The apparatus as claimed in claim 1, wherein the feeding unit comprises: a vertically disposed container having a detachable lid and a detachable base; and a vertically movable plunger for pressing out the polymer gel from the container, wherein the polymer gel is gelled in the container so that the polymer gel is maintained in a shape stable state prior to being pressed out of the container by the plunger.

4. The apparatus as claimed in claim 1, wherein the cutting screen is formed of a material selected from the group consisting of steel, iron, aluminum, copper, and tantalum.

5. The apparatus as claimed in claim 1, wherein the pretensioned members of the cutting screen have a rectangular, square, triangular, hexagonal or round shape, and the pretensioned members are flattened or beveled on at least one side, and the diameter or thickness of each of the members is 0.05 to 10 mm.

6. The apparatus as claimed in claim 1, wherein the cutting screen forms a plurality of interspaces each of which has at least one side that is 0.1 to 200 mm in length.

7. The apparatus as claimed in claim 1, wherein the at least one tensioned wire is formed of a material selected from the group consisting of steel, iron, aluminum, copper, and tantalum.

* * * * *